RE 24684
Jan. 6, 1959      L. B. SWANSON      2,867,443
POWER-OPERATED CHUCK OF THE COMPENSATING TYPE
Filed April 18, 1956      3 Sheets-Sheet 1
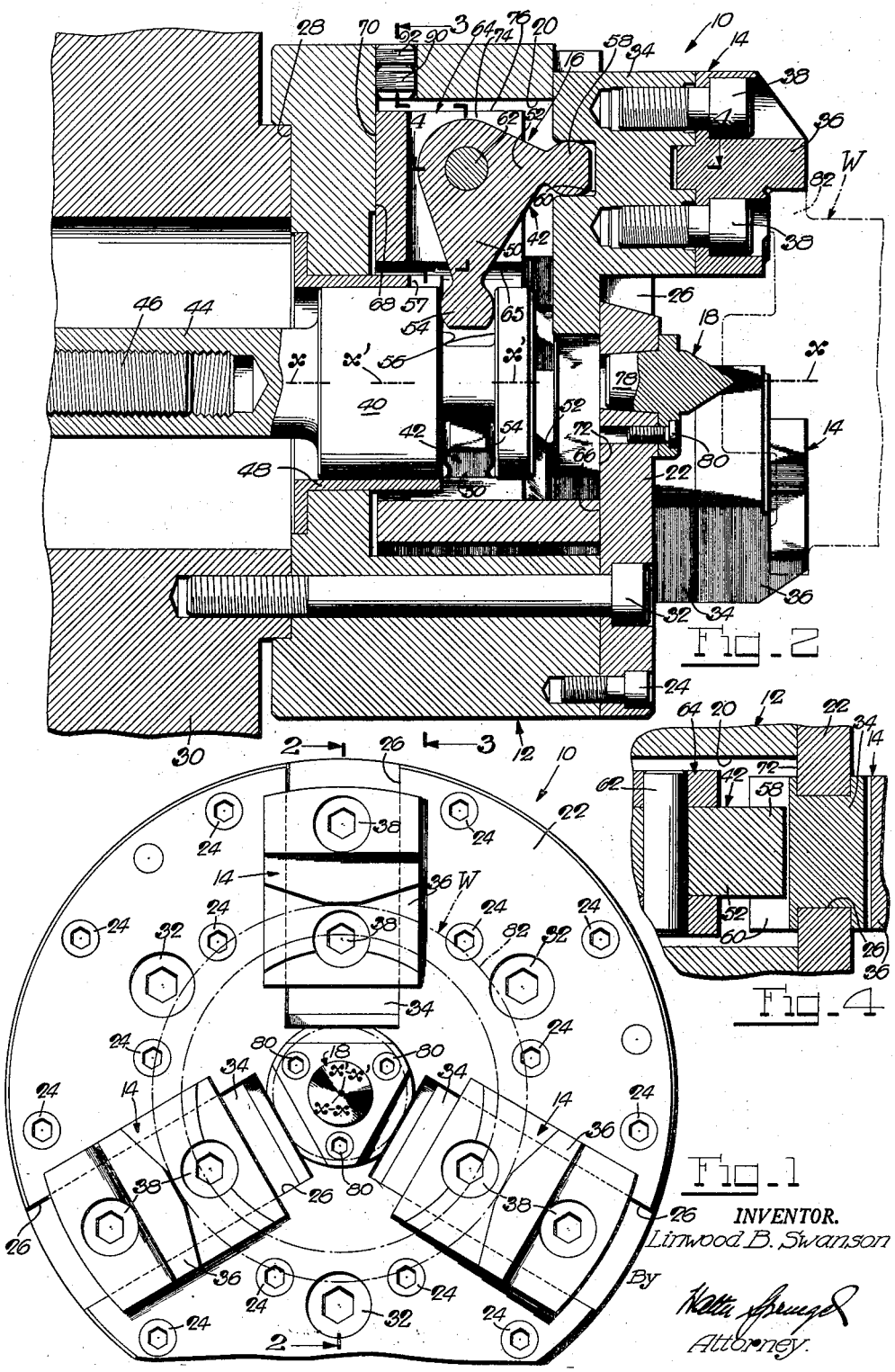
INVENTOR.
Linwood B. Swanson
By
Attorney.

Jan. 6, 1959 L. B. SWANSON 2,867,443
POWER-OPERATED CHUCK OF THE COMPENSATING TYPE
Filed April 18, 1956 3 Sheets-Sheet 2
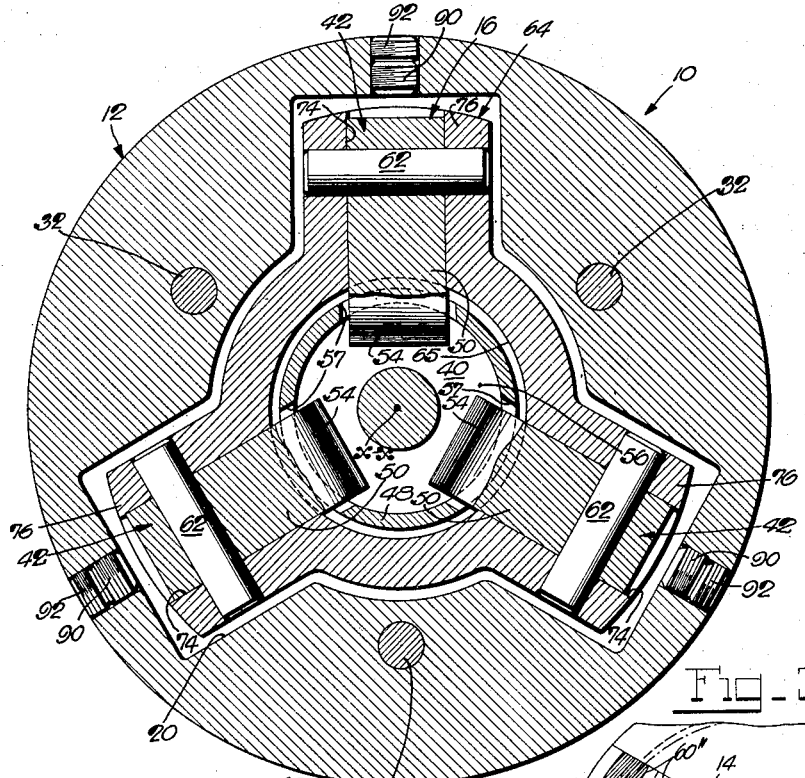
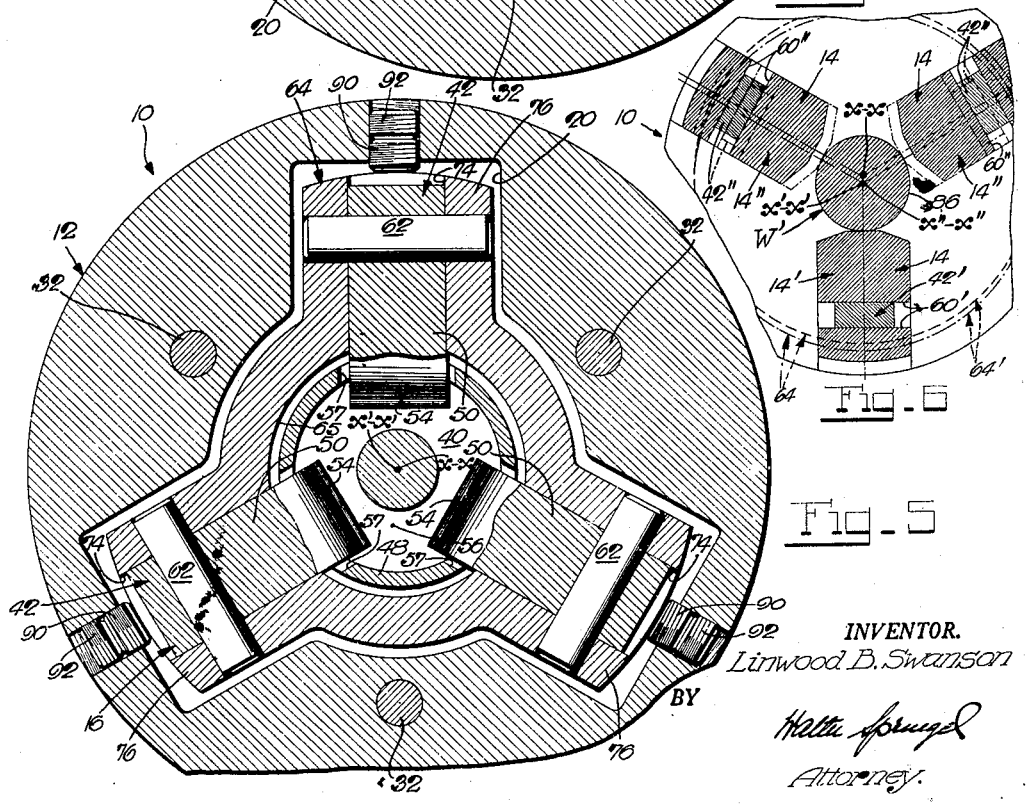
INVENTOR.
Linwood B. Swanson
BY
Attorney.

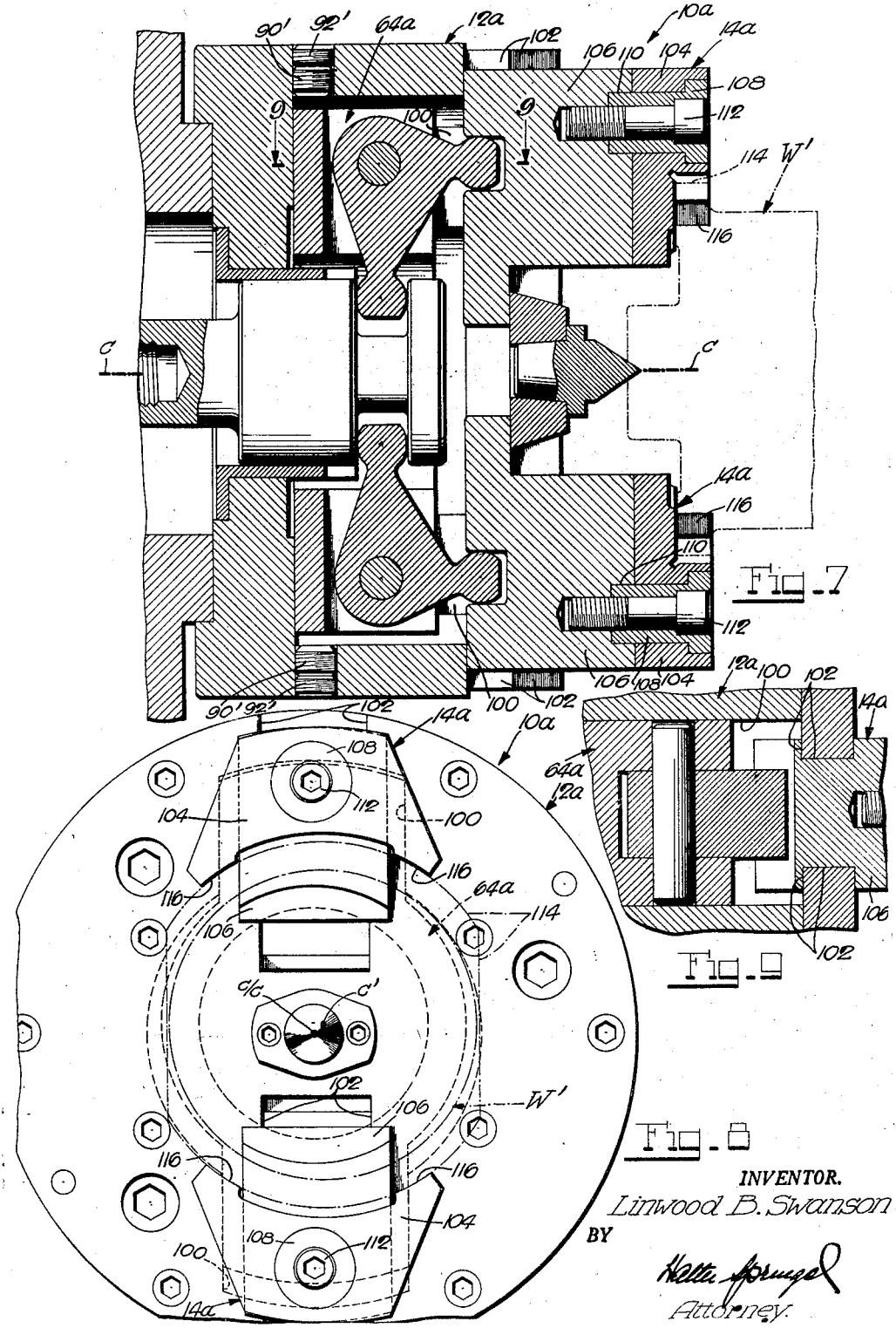

United States Patent Office 2,867,443
Patented Jan. 6, 1959

2,867,443

POWER-OPERATED CHUCK OF THE COMPENSATING TYPE

Linwood B. Swanson, Newington, Conn., assignor to The Cushman Chuck Company, Hartford, Conn., a corporation of Connecticut Application April 18, 1956, Serial No. 578,945

12 Claims. (Cl. 279—119)

This invention relates to chucks in general, and to power-operated chucks of the compensating type in particular.

Chucks of this type are characterized by self-compensating or adjusting jaws which will engage and uniformly grip work requiring centering independently of these jaws, such as work of which the real center of the surfaces gripped by these jaws is inherently off, or may be off, with respect to a desired center with reference to which the work is to be operated on, for instance. While prior chucks of this type are quite satisfactory in their performance, they have not found as wide a use as would be expected in view of the many types of work to which they would lend themselves with particular advantage. The reason therefor lies in the fact that these prior chucks are not only of rather complicated construction and, hence, fairly high in cost, but they are also rather limited in their use in that a given chuck of this type accommodates only work within relatively close dimensional limits. Moreover, the self-adjusting jaws of these prior chucks have inherently a rather limited compensation range and, hence, are incapable of gripping many workpieces for a first machining operation thereon, thus limiting the use of these chucks even further. It is for these principal reasons that prior chucks of this type have primarily been built special for specific work which cannot be as accurately operated on in other available chucks, or which is of sufficient volume to warrant a special chuck of this type.

Accordingly, it is the primary aim and object of the present invention to provide a chuck of this type which not only is of considerably simpler construction and, hence, correspondingly lower cost, and adapts itself to work within much wider dimensional limits, but also has a much wider jaw compensation range, than the aforementioned prior chucks, thereby to make available a chuck of this type which from every consideration is sufficiently attractive clearly to indicate its universal use for all work requiring jaw compensation for a secure grip while being centered independently of the compensating jaws.

It is another important object of the present invention to provide a chuck of this type of which the jaw-operating mechanism includes conventional pivoted bellcrank-type rockers which are associated and directly cooperate with the compensating jaws for moving them into and out of gripping engagement with work, and a conventional axially guided plunger which directly cooperates with and actuates the rockers and which is connectible with a power-operated draw bar of a lathe or other machine tool for which the chuck is intended, thereby not only achieving opening and closing motion of the compensating jaws to an extent comparable to that of the operating plunger and thus adapting the chuck to work of widely varying dimensions, but also permitting the advantageous use of simple and well approved conventional power mechanism for the jaw operation.

It is a further important object of the present invention to provide a chuck of this type of which the jaw-operating mechanism is complete by the further inclusion of a simple common cage or carrier for the aforementioned jaw rockers which is freely movable or floatable in the chuck body, within desired limits, in a plane at right angles to the chuck axis, thereby not only permitting the aforementioned advantageous use of approved conventional jaw-operating mechanism, including conventional pivoted jaw rockers, for compensating jaws in a chuck of this type in the first place, and placing all compensating jaws jointly under the control of the aforementioned operating plunger to the end of keeping them in any of their open or closed positions disposed concentrically with respect to the center axis of the floating cage and thereby permitting easy and expeditious exchange of work in the chuck, but also obtaining a chuck of the compensating type which in its construction is almost as simple and, hence, as low in cost, and in its jaw operation as free and non-binding, as a non-compensating chuck of the same rocker-operated jaw type.

Another important object of the present invention is to provide a chuck of this type of which the aforementioned rocker cage may have floatability to an extent fully adequate to permit the compensating jaws to grip most any workpiece for a first intended machining or other operation thereon despite even exceptional off-center condition of the gripped work surfaces, thereby further enhancing the universal use of the chuck for all work requiring jaw compensation for a uniform and secure grip.

A further important object of the present invention is to make provisions in a chuck of this type for readily converting the same from a compensating type into a non-compensating type in which the jaws are no longer self-adjustable to the work but center the same instead, thereby still further enhancing the use of the chuck.

It is another object of the present invention to provide for the aforementioned conversion of the compensating chuck into a non-compensating chuck by providing the chuck body with angularly spaced and readily accessible set screws which are retracted from the aforementioned floating rocker cage when the chuck is used as a compensating one, and which are simply driven against the rocker cage to center the same on the chuck axis, or even on another axis for some special work, and hold it against floating motion for use of the chuck as a non-compensating one, thereby not only adding this highly advtantageous conversion feature to the chuck at no extra cost and achieving the conversion of the latter from either type into the other quickly and by a few simple manipulations, but also adding to the chuck still another desirable feature when the same is used as a non-compensating chuck, to wit, center-adjustability of the jaws thereof whenever for any reason whatever, such as wear of any one or more of the parts of the chuck adverse to accurate work centering, it becomes necessary to re-center the chuck jaws on the power spindle of a lathe or other machine tool on which the chuck is mounted.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary front view of a chuck embodying the present invention;

Fig. 2 is a longitudinal section through the chuck as taken on line 2—2 of Fig. 1;

Fig. 3 is a cross section through the chuck taken substantially on the line 3—3 of Fig. 2;

Fig. 4 is a fragmentary section taken on the line 4—4 of Fig. 2;

Fig. 5 is a cross section through the chuck similar to Fig. 3, but showing the chuck converted into a different type;

Fig. 6 is a diagrammatic view of the chuck demonstrating its principle of operation;

Fig. 7 is a longitudinal section through a chuck embodying the present invention in a modified manner;

Fig. 8 is a fragmentary front view of the modified chuck of Fig. 7; and

Fig. 9 is a fragmentary section taken on the line 9—9 of Fig. 7.

Referring to the drawings, and more particularly to Figs. 1 to 3 thereof, the reference numeral 10 designates a chuck which comprises a body 12, jaws 14, jaw-operating mechanism 16, and a work center 18. The chuck body 12 is in its front provided with a suitable recess 20 (see also Fig. 3) which is closed by a front plate 22 that is secured to the body 12 by screws 24. The front plate 22 is provided with a plurality of equiangularly spaced radial guide slots 26, presently three (see also Fig. 4), in which the jaws 14 are slidable into and from gripping engagement with the work W. The chuck body 12 is in its rear provided, in this instance, with another annular recess 28 for its accurate centered location on the power spindle 30 of a lathe or other machine tool on which it is releasably mounted by a plurality of bolts 32.

Each of the jaws 14 comprises a customary master jaw 34 and a top or work-gripping jaw 36 secured thereto by screws 38. For the sake of simplicity of description, however, each master jaw 34 and associated top jaw 36 are jointly referred to simply as "jaw."

The jaw-operating mechanism 16 comprises, in the present instance, a plunger 40 and a plurality of rockers 42 which are operated by the plunger 40 and, in turn, operate the jaws 14 with which they are associated. The plunger 40, which has an internally threaded shank 44 for its releasable connection with a conventional power-operated draw bar 46, is guided for sliding movement axially of the chuck body 12 in a sleeve 48 therein which for optimum plunger guide performance extends into the front recess 20 in the chuck body (Fig. 2). The rockers 42 are, significantly, pivoted bellcrank levers having diverging arms 50 and 52 of which the free or follower ends 54 of the arms 50 are presently roller-shaped and project into a peripheral groove 56 in the plunger 40 for their operating connection therewith. In order to permit the rockers 42 to swing through an optimum range for jaw opening and closure without interfering with the optimum plunger guide performance of the sleeve 48, the latter is provided in its front end with rocker-clearance slots 57. The free ends 58 of the arms 52 of the rockers 42 are also roller-shaped and project into transverse grooves 60 in the rear of the jaws 14 for their operating connection with the latter.

In accordance with an important aspect of the present invention, the rockers 42 are pivotally mounted on pins 62 in a cage or carrier 64 in the body recess 20 which presently is cross-sectionally shaped similarly as the latter but, significantly, is sufficiently smaller than this body recess 20 to have considerable freedom of lateral motion in all directions therein (Fig. 3). To the same end, the cage 64 is provided with a central recess 65 which is sufficiently large to permit the aforementioned considerable freedom of lateral motion of the cage without interference from the plunger guide 48. Further in accordance with the present invention, the rocker carrier or cage 64 is machined at its front and rear faces 66 and 68 so as axially to fit in the closed body recess 20 and be slidable on the machined bottom surface 70 thereof and on the inner face 72 of the front plate 22 (Fig 2). The cage 64 is thus floatable to a considerable extent in the chuck body 12 in any direction in a plane at right angles to the body or chuck axis x—x.

The rockers 42 are advantageously received in radial grooves 74 in cut-back lobes 76 of the cage 64 so as to transmit any torsional operating stresses in the rockers directly to the cage rather than through the pivot pins 62. Also, as usual in conventional non-compensating chucks of the rocker-operated jaw type but imperative in the case of the instant compensating chuck for reasons described hereinafter, the roller-shaped ends 58 of the rocker arms 52 have freedom to float in the respective jaw grooves 60 lengthwise thereof (Fig. 4).

The work center 18 is arranged coaxially of the chuck axis x—x, having to this end a tapered shank 78 which is mounted in the front plate 22 by screws 80. The work center 18 may for its performance cooperate with another, similar center (not shown) in the tailstock, for instance, of the lathe on which the chuck is mounted.

In the present instance, the exemplary centered work W in Fig. 2 is gripped by the compensating jaws 14 on a flange 82 which, for the sake of simplicity of illustration, is shown to be concentric with the centered work and, hence, with the chuck axis x—x, wherefore the center axis x'—x' of the floating cage 64 coincides with the chuck axis x—x under the circumstances (Figs. 1 and 2). However, the present chuck, being of the compensating type, is particularly advantageous for operations on work of which the surface to be gripped by the jaws 14 is off-center with respect to the axis on which the work is centered on the chuck, as on the center 18, for instance. Thus, Fig. 6 illustrates in a diagrammatic manner the performance of the chuck on exemplary work W' of which the cylindrical surface 86 to be gripped by the jaws 14 is considerably eccentric with respect to the chuck axis x—x on which the work is oriented through intermediation of the center 18 (Fig. 2) and from which it cannot move while being centered thereon. The considerable eccentricity of the work surface 86 is clearly demonstrated in Fig. 6 by the considerable distance between its center axis x''—x'' and the chuck axis x—x. Assuming now that the jaws 14 in their full line positions in Fig. 6 were left open after previously gripping a work surface which was concentric with the axis on which the work was centered on the chuck, and that the new work W' is centered on the chuck and held in the illustrated exemplary angular position for its grip by the jaws 14, i. e. resting on the lower jaw 14' and clearing the upper jaws 14'', it then stands to reason that on subsequent retraction of the plunger 40 on the draw bar 46, to the left as viewed in Fig. 2, the jaws 14'' (Fig. 6) will have to move inwardly into gripping engagement with the work W'' while the jaw 14' remains stationary, being so held by the centered work on the chuck. Since operation of any of the rockers 42 independently of the other rocker or rockers is impossible in view of their operating connection with the common plunger 40, it is only on simultaneous operation of all rockers that the remaining jaws 14'' can possibly be brought into gripping engagement with the work. Yet, since the lower jaw 14' is already in engagement with the centered work W', it stands to reason that the imperative turning motion of its associated rocker on operation of the plunger 40 for jaw closure on the work cannot possibly move this lower jaw inwardly and, hence, must be translatable into bodily motion of the cage 64. More particularly, the rear groove 60' in the lower jaw 14' will, on operation of the plunger 40 for jaw closure on the work, act as a fulcrum for the associated rocker 42' about which the latter will turn on being operated and, in consequence, will shift the cage 64' from its original dotted-line position into its dot-and-dash line position (Fig. 6) in which its center axis x'—x' coincides with the center axis x''—x'' of the gripped eccentric work surface 86. Also, since the pivoted rockers 42 are oriented with respect to the center axis x'—x' of the cage 64 and cannot deviate from their prescribed radial paths in the latter, all the rockers will remain thus oriented in the cage, with the result that on their joint operation and ensuing bodily shift of the cage the ends of the rockers 42″ in the rear groves 60″ of the respective jaws 14″ will shift therein from the full line positions into the dot-and-dash line positions (Fig. 6) in which they are oriented with the center axis $x'$—$x'$ of the cage in its new dot-and-dash line position, as explained. After thus gripping the work W′ with all jaws 14, the same is ready to be operated on in any desired manner and with reference to the chuck axis $x$—$x$ on which the work is centered.

The described exemplary placement of the work W′ in the present chuck and closure of the compensating jaws 14 on the eccentric work surface 86 (Fig. 6) clearly demonstrates the principle of operation of the chuck and the action of its operating parts when confronted with any work requiring compensating action of the jaws for their secure and uniform grip of the work. Thus, regardless of which one or ones of the jaws 14 engage such centered work first on operation of the plunger 40 for jaw closure on the work, that jaw, or those jaws, which first engage the work will bring about a compensating bodily shift of the cage 64 until all the jaws are in uniform engagement with the work, whereupon they will simultaneously exert the same uniform gripping force on the work after the bodily shift of the cage has ceased. Also, each compensating bodily shift of the cage 64 in consequence of the grip by the jaws of an off-center portion of centered work entails a shift, mostly small but definite, of any or all ends of the rockers in the rear grooves of the respective jaws. Hence, the described floatability of the cage 64 in the chuck body and the described floating driving connections between the jaw-actuators in the cage and the jaws themselves are primary features of the present invention and imperative for the correct compensating action of the jaws of the instant chuck even if the pivoted jaw-actuators in the cage were not the exemplary rockers shown but equivalent elements.

The exemplary bellcrank-type rockers 42 are, of course, highly advantageous, not only because they permit opening and closing motion of the compensating jaws to an extent comparable to that of the common operating plunger and thus adapt the chuck to work of widely varying dimensions, but also permit the advantageous use of simple and well-approved conventional power mechanism for the jaw operation, including the common rocker-operating plunger. Of further significance is the fact that the cage 64 will never become jammed to the chuck body and will readily respond to each jaw opening and closing stroke of the plunger 40 and permit full opening and closing of the jaws without requiring the full force of the plunger necessary for holding the jaws in secure gripping engagement with work, this by virtue of the fact that the major components of the forces on the cage reacting with the operating forces on the rockers are harmlessly directly radially outwardly or inwardly. Also, the cage 64 may have floatability of most any desired extent in the chuck body without adding any bulk to the chuck, thereby permitting the compensating jaws to grip most any workpiece for a first intended machining or other operation thereon despite even exceptional off-center condition of the gripped work surfaces and, hence, further enhancing the universal use of the chuck for all work requiring jaw compensation for a uniform and secure grip. Moreover, while the cage is imperative as a tie between or support for the pivot pins 62 of all jaw-actuators or rockers 42, the same is further advantageous in that it places all compensating jaws under the control of the aforementioned operating plunger to the end of keeping these jaws in any of their open or closed positions disposed concentrically with respect to the cage axis and thus permitting easy and expeditious exchange of work in the chuck. Last, but by no means least, insofar as the number of structural parts is concerned, the present compensating chuck differs from a conventional non-compensating chuck of the rocker-operated jaw type only by the addition of the rocker cage and the work center 18, wherefore the present chuck is in its construction almost as simple, and hence almost as low in cost, as a conventional non-compensating chuck.

It is also fully within the purview of the present invention to provide the instant chuck with additional power-operated work-centering jaws in lieu of the exemplary work center 18 shown, and thus adapt the chuck to hollow or tubular work. Such additional work-centering jaws may be arranged on the present chuck in a manner like or similar to that disclosed in the patent to Harry E. Sloan, No. 2,698,125, dated December 28, 1954. It is further fully within the purview of the present invention to arrange the compensating jaws and their operating mechanism in the present chuck such that these jaws grip internal off-center portions of hollow work which is externally or otherwise centered on the chuck.

The present chuck embodies another important feature, namely that of convertibility from a compensating type (Figs. 1 and 3) into a non-compensating type (Fig. 5), and vice versa. To this end, suitable provisions are made to lock the cage 64 to the chuck body 12 in a position in which the cage axis $x'$—$x'$ coincides with the chuck axis $x$—$x$ (Fig. 5). This is achieved, in the present instance, by providing in the chuck body 12 set screws 90 which are accessible from the outside and may be driven inwardly into engagement with the periphery of the cage while the latter is suitably held centered on the chuck axis. Of course, the cage may, and will in most cases, be centered on the chuck axis $x$—$x$ on appropriate manipulation of the set screws 90. After manipulation of the set screws 90 for the conversion of the chuck into the non-compensating type shown in Fig. 5, they are preferably locked in place by additional screws 92. For reconversion of the chuck from the non-compensating type into the compensating type, it is merely necessary to loosen the lock screws 92 and retract both, set and lock screws 90 and 92 from the periphery of the cage 64 so that the latter may float again.

The exemplary set screws 90 used for the described chuck conversion add another important feature to the instant chuck, namely that of convertibility of the same into a non-compensating chuck of the center-adjustable type. Thus, whenever for any reason whatever, such as wear of any one or more of the parts of the chuck adverse to accurate work centering, the non-compensating chuck jaws are no longer accurately centered on the power spindle of a lathe or other machine tool on which the chuck is mounted, the set screws 90 may be manipulated to re-center the chuck jaws on the power spindle.

While in the described chuck 10 the relative movability between the cage 64 and jaws 14 requisite for compensating action of the latter is achieved by arranging for floatability of the cage in a plane at right angles to the chuck axis, in all directions relative to the chuck body 12 and transversely of and relative to the jaws, Figs. 7 and 8 show a modified chuck 10a in which the relative movability between the cage 64a and jaws 14a requisite for compensating action of the latter is achieved by arranging for floatability of the cage back and forth in only one direction in a plane at right angles to the chuck axis relative to the chuck body 12a and for floatability of the jaws 14a relative to the chuck body and cage transversely of the single direction of floatability of the latter. However, this arrangement permits the use of only two diametrically opposite jaws 14a, and the cage 64a must be floatable in the diametrical direction of the jaws in order that the latter may have compensating action on work W′. To this end, the cage 64a is slidable back and forth in a guideway 100 in the chuck body 12a which extends parallel to the diametrically aligned guideways 102 for the jaws 14a. For the requisite floatability of the jaws 14a on the chuck body 12a transversely of the single direction of floatability of the cage 64a, the top jaws 104 are pivotally mounted on the master jaws 106 in the guideways 102. For their pivotal mounting in assuredly shear-proof fashion on the master jaws 106, the top jaws 104 are provided with wear-resistant bushings 108 which extend into annular recesses 110 in the respective master jaws, while screws 112 serve to retain the top jaws on the master jaws.

The exemplary work W' is gripped by the top jaws 104 on an end flange 114 which has its center c' offset with respect to the chuck axis c—c on which the work is centered (Fig. 8). Hence, in order that the top jaws 104 may uniformly grip the eccentric end flange 114 of the exemplary work W', the cage 64a and the jaws 14a will have to slide bodily into the position shown in Fig. 8 in which the top jaws 104 may pivot so that their gripping surfaces 116 will uniformly engage the work flange 114, as will be readily understood. Of course, the top jaws 104, in order to have a compensating action, need not be pivoted on the master jaws 106 but may, instead, be bodily floatable thereon transversely thereof, though the pivotal mounting of the top jaws on the master jaws is preferred for simplicity of construction and substantially non-binding adaptation of the top jaws to the work being gripped thereby. Also, the present chuck may advantageously be provided with set and lock screws 90' and 92', respectively, for its ready conversion into a non-compensating chuck.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a compensating chuck, the combination with a chuck body having a longitudinal axis and jaws guided thereon for movement into and from gripping engagement with work, of a carrier floatable in said body in any direction in a plane at right angles to said axis; devices associated with said jaws, respectively, being pivoted on said carrier and having with their associated jaws driving connections floatable transversely of the latter for moving said jaws on rocking said devices about their pivot axes; and means in said body for simultaneously rocking said devices while permitting said carrier to float.

2. The combination in a compensating chuck as set forth in claim 1, further comprising means on said body other than said jaws for centering work on the chuck.

3. The combination in a compensating chuck as set forth in claim 1, further comprising means carried by said body and operable releasably to lock said carrier against floating motion in a positon in which said jaws are centered on said body axis.

4. The combination in a compensating chuck as set forth in claim 1, further comprising means carried by said body and adjustable releasably to lock said carrier in any of an infinite number of positions against floating motion therefrom.

5. In a compensating chuck, the combination with a chuck body having a longitudinal axis and jaws guided thereon for movement into and from gripping engagement with work, of a carrier floatable in said body in any direction in a plane at right angles to said axis; levers associated with said jaws, respectively, being pivoted on said carrier and having first and second diverging arms of which said first arms and associated jaws have driving connections floatable transversely of the latter for moving said jaws on rocking said levers about their pivot axes; and means in said body drivingly connected with said second arms of said levers and operative simultaneously to rock the latter while permitting said carrier to float.

6. The combination in a compensating chuck as set forth in claim 5, in which said means comprises a plunger slidable in said body axially thereof and having a peripheral groove into which said second lever arms project.

7. In a compensating chuck, the combination with a chuck body having a longitudinal axis, and jaws guided thereon for radial movement and having in back thereof grooves extending at right angles to their directions of movement, of a carrier floatable in said body in any direction in a plane at right angles to said body axis and having a center axis parallel to the latter; bellcrank levers associated with said jaws, respectively, being pivoted on said carrier for rocking motion in radial planes, respectively, in which said center axis lies and having first and second arms diverging from their pivot axes of which said first arms project into said grooves in the associated jaws with freedom to move transversely therein for moving said jaws on rocking said levers; and means in said body drivingly connected with said second arms of said levers and operative simultaneously to rock the latter while permitting said carrier to float, whereby said levers float with said carrier relative to the chuck body and jaws until all jaws are in uniform engagement with work to be gripped.

8. The combination in a compensating chuck as set forth in claim 7, in which said carrier has grooves extending radially with respect to said center axis for fitted reception of said levers.

9. The combination in a compensating chuck as set forth in claim 7, in which said carrier is ring-shaped and has a central aperture and grooves extending radially with respect to said center axis for fitted reception of said levers, and said means comprises a plunger slidable in said body axially thereof within said carrier aperture with clearance therefrom throughout and having a peripheral groove into which said second lever arms project.

10. The combination in a compensating chuck as set forth in claim 7, in which said carrier has a cylindrical periphery, and there are further provided angularly spaced set screws threadedly received in said body and turnable from the outside thereof for their engagement with said periphery of said carrier to lock the latter in any one of an infinite number of positions against floating motion therefrom.

11. In a compensating chuck, the combination with a chuck body having a longitudinal axis and jaws movable thereon into and from gripping engagement with work, of a carrier floatable back and forth in said body at least in the direction of movement of one of said jaws and in a plane at right angles to said axis; devices associated with said jaws, respectively, and including elements pivoted on said carrier, said devices being operatively connected with their associated jaws for moving the latter on rocking said elements, and said devices permitting relative floating movement between said carrier and jaws transversely of said direction; and means in said body for simultaneously rocking said elements while permitting said carrier to float, whereby said elements float with said carrier relative to the chuck body and jaws until all jaws are in uniform engagement with work to be gripped.

12. In a compensating chuck, the combination with a chuck body having a longitudinal axis, of a pair of opposite jaws guided on said body for bodily movement diametricaly of said axis and rockable about axes parallel to said body axis; a carrier guided in said body for floating movement in a plane at right angles to said body axis and parallel to the diametrical movability of said jaws; devices associated with said jaws, respectively, being pivoted on said carrier and having driving connections with their associated jaws for bodily moving the latter, while permitting them to rock, on rocking said devices about their pivot axes; and means in said body for simultaneously rocking said devices while permitting said carrier to float, whereby said devices float with said carrier relative to the chuck body and jaws until both jaws are in uniform engagement with work to be gripped.

References Cited in the file of this patent

UNITED STATES PATENTS

| | | |
|---|---|---|
| 1,446,060 | Pratt | Feb. 20, 1923 |
| 2,422,785 | Johnson | Dec. 21, 1943 |
| 2,524,485 | Sloan | Oct. 3, 1954 |
| 2,794,648 | Sampson | June 4, 1957 |